United States Patent
Morita et al.

(10) Patent No.: US 11,342,673 B2
(45) Date of Patent: May 24, 2022

(54) WIRELESS SYSTEM AND METHOD FOR CONTROLLING WIRELESS SYSTEM

(71) Applicant: CANON KABUSHIKI KAISHA, Tokyo (JP)

(72) Inventors: Jun Morita, Tokyo (JP); Koji Yukimasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 16/827,242

(22) Filed: Mar. 23, 2020

(65) Prior Publication Data

US 2020/0313293 A1 Oct. 1, 2020

(30) Foreign Application Priority Data

Mar. 29, 2019 (JP) .............................. JP2019-067477

(51) Int. Cl.
*H01Q 7/00* (2006.01)
*H01Q 5/40* (2015.01)
*H01Q 1/12* (2006.01)
*H02J 50/10* (2016.01)
*H01Q 1/22* (2006.01)
*H01Q 3/02* (2006.01)

(52) U.S. Cl.
CPC ............... *H01Q 7/00* (2013.01); *H01Q 1/125* (2013.01); *H01Q 1/22* (2013.01); *H01Q 3/02* (2013.01); *H01Q 5/40* (2015.01); *H02J 50/10* (2016.02)

(58) Field of Classification Search
CPC ............ H01Q 1/125; H01Q 1/22; H01Q 3/02; H01Q 3/08; H01Q 5/40; H01Q 7/00; H02J 50/10; H02J 50/20; H02J 50/23; H02J 50/27; H02J 50/90; G03B 17/561; H04B 5/0031; H04B 5/0037; H04B 5/0075–0093
See application file for complete search history.

(56) References Cited

U.S. PATENT DOCUMENTS 9,887,590 B2 * 2/2018 Kikuchi .................. H02J 50/80
2017/0048457 A1   2/2017 Eguchi
2018/0205264 A1 * 7/2018 Akuzawa ............... H01Q 1/248

FOREIGN PATENT DOCUMENTS

JP        2015-226136 A     12/2015

* cited by examiner

*Primary Examiner* — Robert Karacsony
(74) *Attorney, Agent, or Firm* — Canon U.S.A., Inc. IP Division

(57) ABSTRACT

A wireless system includes a first antenna configured to form at least part of the shape of a first ring, a second antenna configured to form at least part of the shape of a second ring, where the second antenna is capable of being coupled to the first antenna by an electromagnetic field, a first rotation control unit configured to rotate at least one of the first antenna and the second antenna about a first axis that passes through the substantial center of the first ring, and a second rotation control unit configured to rotate at least one of the first antenna and the second antenna about a second axis that passes through the substantial center of the second ring and that is substantially orthogonal to the first axis.

20 Claims, 12 Drawing Sheets

WIRELESS SYSTEM AND METHOD FOR CONTROLLING WIRELESS SYSTEM

BACKGROUND

Field of the Disclosure

The present disclosure relates to a wireless system that performs short range wireless communication and/or wireless power transmission by electromagnetic field coupling.

Description of the Related Art

In recent years, a short range wireless communication system has been developed that wirelessly performs data communication and power transmission in a movable portion of a device by electromagnetic field coupling among a plurality of antennas in close proximity. By performing data communication and the like in the movable portion wirelessly, the movable range of the movable portion can be expanded as compared with the case where data communication and the like are performed by wire. In addition, problems due to wear of a cable and the like can be avoided.

Japanese Patent Laid-Open No. 2015-226136 describes a technique to expand the movable range in the pan direction of a camera by wirelessly performing data communication and power transmission between a rotary unit and a base unit of a surveillance camera. However, in the technique described in Japanese Patent Laid-Open No. 2015-226136, an antenna pair that performs data communication and the antenna pair that performs power transmission rotate only about a single axis (in the pan direction). For this reason, the movable range in, for example, the tilt direction of the camera cannot be expanded.

SUMMARY

According to an embodiment, a wireless system includes a first antenna configured to form at least part of a shape of a first ring, a second antenna configured to four at least part of a shape of a second ring, where the second antenna is capable of being coupled to the first antenna by an electromagnetic field, a first rotation control unit configured to rotate at least one of the first antenna and the second antenna about a first axis that passes through the substantial center of the first ring, and a second rotation control unit configured to rotate at least one of the first antenna and the second antenna about a second axis that passes through the substantial center of the second ring and that is substantially orthogonal to the first axis.

Further features of various embodiments will become apparent from the following description of exemplary embodiments with reference to the attached drawings.

DESCRIPTION OF THE EMBODIMENTS

System Configuration

Figure 1:
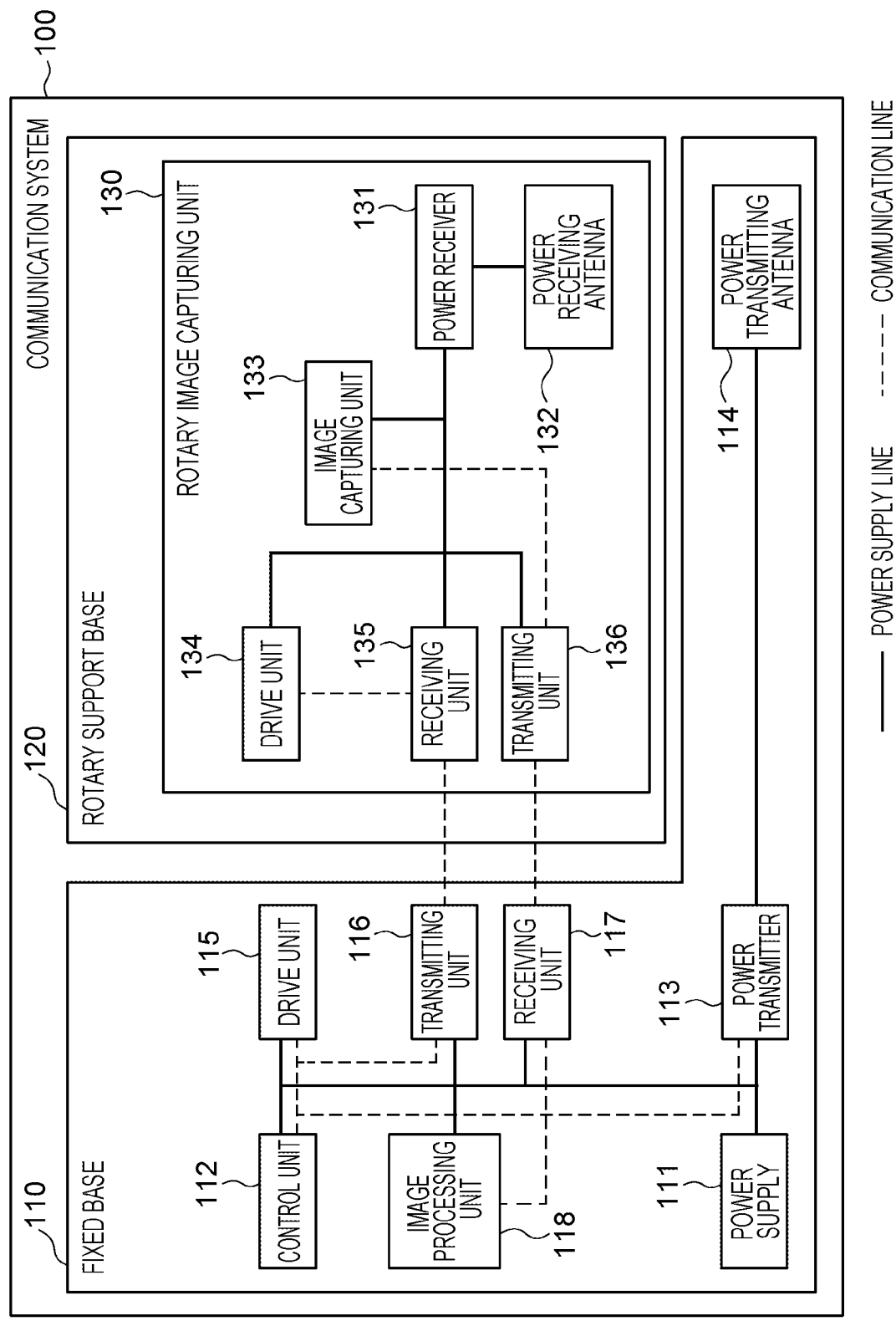
FIG. 1 is a block diagram illustrating an example of the system configuration of a communication system.

Exemplary embodiments are described below with reference to the accompanying drawings. FIG. 1 illustrates the system configuration of a communication system 100 according to the present exemplary embodiment. According to the present exemplary embodiment, an example is described in which the communication system 100 is mounted on a network camera which is an image capturing apparatus including an image capturing unit rotatable in the pan direction and the tilt direction. In this example, each of the constituent elements of the communication system 100 is mounted on any one of a fixed base 110, a rotary support base 120, and a rotary image capturing unit 130. The fixed base 110 is a base unit for installing the network camera on a wall or a ceiling. The rotary support base 120 is a rotary unit that rotates in the pan direction with respect to the fixed base 110. The rotary image capturing unit 130 is a rotary unit that rotates in the tilt direction with respect to the rotary support base 120.

The fixed base 110 includes a power supply 111, a control unit 112, a power transmitter 113, a power transmitting antenna 114, a drive unit 115, a transmitting unit 116, a receiving unit 117, and an image processing unit 118. The rotary image capturing unit 130 includes a power receiver 131, a power receiving antenna 132, an image capturing unit 133, a drive unit 134, a receiving unit 135, and a transmitting unit 136. Power for operating the rotary image capturing unit 130 and data for controlling the rotary image capturing unit 130 are transmitted from the fixed base 110 to the rotary image capturing unit 130. In addition, image data obtained by the image capturing unit 133 is transmitted from the rotary image capturing unit 130 to the fixed base 110. The communication system 100 has a structure for supporting the power transmitting antenna 114 and the power receiving antenna 132 so as to maintain a predetermined positional relationship between the power transmitting antenna 114 and the power receiving antenna 132 (for example, the distance between the antennas is maintained so as to be substantially constant). The structure of the communication system 100 is described in more detail below with reference to FIGS. 2A to 2C and the like.

The power supply 111 supplies the power needed for operating the entire system. More specifically, the power supply 111 converts power acquired from a commercial power outlet on a wall or a ceiling into the power for driving the system. Thereafter, the power supply 111 supplies the power to each of the constituent elements mounted on the fixed base 110. Note that the power supply 111 may supply power acquired from a battery cell. The control unit 112 controls the operations performed by the power transmitter 113, the drive unit 115, the transmitting unit 116, the receiving unit 117, and the image processing unit 118.

The power transmitter 113 includes a power transmitting circuit. The power transmitter 113 performs power transmission control to control wireless power transmission based on electromagnetic field coupling between the power transmitting antenna 114 and the power receiving antenna 132. More specifically, the power transmitter 113 uses a switch circuit to convert a DC voltage supplied from the power supply 111 into an AC voltage with a frequency suitable for power transmission. Thereafter, the power transmitter 113 applies the converted voltage to the power transmitting antenna 114. FIG. 1 illustrates an example in which the communication system 100 includes a pair consisting of power transmitting and receiving antennas. However, the communication system 100 may include two or more pairs each consisting of a power transmitting antenna and a power receiving antenna.

The electromagnetic field coupling according to the present exemplary embodiment includes both electric field coupling and magnetic field coupling. That is, wireless power transmission between antennas may be performed by electric field coupling, magnetic field coupling, or both electric field coupling and magnetic field coupling. The magnetic field coupling includes electromagnetic induction and magnetic field resonance. Alternatively, the wireless power transmission may be performed by a method using microwaves. According to the present exemplary embodiment, a description is mainly given of the case where each of the power transmitting antenna 114 and the power receiving antenna 132 is a coil formed of a conductor, and wireless power transmission is performed by magnetic field coupling.

The drive unit 115 includes a motor or the like that receives input of the electric power supplied from the power supply 111. The drive unit 115 performs rotation control for rotating the rotary support base 120 with respect to the fixed base 110 in accordance with an instruction received from the control unit 112. Note that the drive unit 115 for rotating the rotary support base 120 may be mounted on the rotary support base 120. Alternatively, the drive unit 115 may rotate the fixed base 110 with respect to the rotary support base 120. That is, at least one of the fixed base 110 and the rotary support base 120 needs to be relatively rotated.

The transmitting unit 116 transmits, to the receiving unit 135, control data for controlling the rotary image capturing unit 130 under the control of the control unit 112. The receiving unit 117 receives, from the transmitting unit 136, image data obtained through the image capturing operation performed by the rotary image capturing unit 130. Data communication via the transmitting unit 116 and the receiving unit 117 may be performed by wire or wirelessly. If data communication is performed by wire, cables are connected between the transmitting unit 116 and the receiving unit 135 and between the receiving unit 117 and the transmitting unit 136. The configuration employed when data communication is performed wirelessly is described below with reference to FIG. 7 and the like. Note that the transmitting unit 116 and the receiving unit 135 may be connected via a slip ring.

The image processing unit 118 acquires the image data received by the receiving unit 117 and performs image processing, such as image recognition and object detection processing. Note that the image data received by the receiving unit 117 may be output to an external device outside the communication system 100, and the external device may perform image processing.

The rotary image capturing unit 130 includes the power receiver 131, the power receiving antenna 132, the image capturing unit 133, the drive unit 134, the receiving unit 135, and the transmitting unit 136. The power receiver 131 includes a power receiving circuit. The power receiver 131 performs control for controlling wireless power transmission by electromagnetic field coupling between the power transmitting antenna 114 and the power receiving antenna 132. More specifically, the power receiver 131 rectifies an AC voltage generated in the power receiving antenna 132 in response to voltage application to the power transmitting antenna 114 into a DC voltage. Thus, the power receiver 131 supplies driving power to each of the constituent elements of the rotary image capturing unit 130. The image capturing unit 133 acquires image data by capturing an image in an image capturing mode corresponding to the control data received by the receiving unit 135. The receiving unit 135 receives the control data transmitted from the transmitting unit 116 and outputs the control data to the drive unit 134 and the image capturing unit 133. The transmitting unit 136 transmits the image data acquired by the image capturing unit 133 to the receiving unit 117.

The drive unit 134 includes a motor or the like that receives input of the electric power supplied from the power receiver 131. The drive unit 134 performs rotation control in accordance with the control data received by the receiving unit 135 so as to rotate the rotary image capturing unit 130 with respect to the rotary support base 120. The rotation of the rotary support base 120 in the pan direction and the rotation of the rotary image capturing unit 130 in the tilt direction enable the image capturing unit 133 to capture images in various directions. Note that a drive unit 134 for rotating the rotary image capturing unit 130 may be mounted on the rotary support base 120. Alternatively, the drive unit 134 may rotate the rotary support base 120 with respect to the rotary image capturing unit 130. That is, at least one of the rotary support base 120 and the rotary image capturing unit 130 is required to relatively rotate.

An object to which the communication system 100 is applied is not limited to the network camera described in the present exemplary embodiment. For example, the constituent elements mounted on the fixed base 110 illustrated in FIG. 1 may be mounted on the arm portion of a robot arm, and the constituent elements mounted on the rotary image capturing unit 130 illustrated in FIG. 1 may be mounted on the hand (end effector) portion of the robot arm. At this time, the power and control data for operating the hand portion may be transmitted from the arm portion to the hand portion, and sensor data obtained by a sensor included in the hand portion may be transmitted from the hand portion to the arm portion. FIG. 1 illustrates an example in which bidirectional communication is performed in the communication system 100. However, some embodiments are not limited thereto, and unidirectional communication may be performed.

Physical Structure of System

Figure 2A:
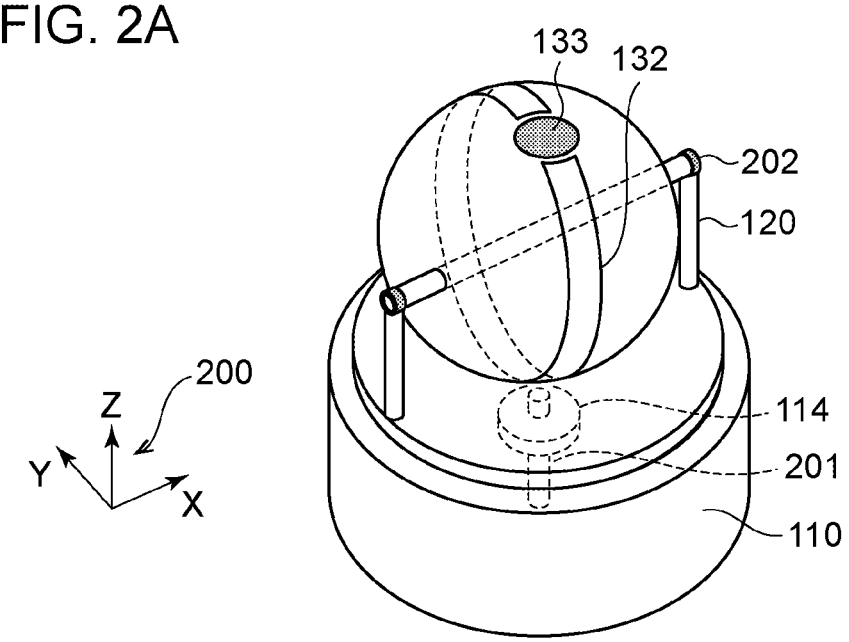
FIGS. 2A to 2C illustrate an example of the shape of the communication system.
Figure 2B:
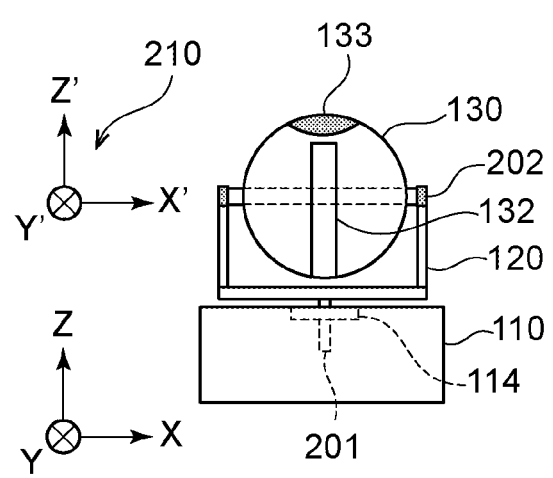
Figure 2C:
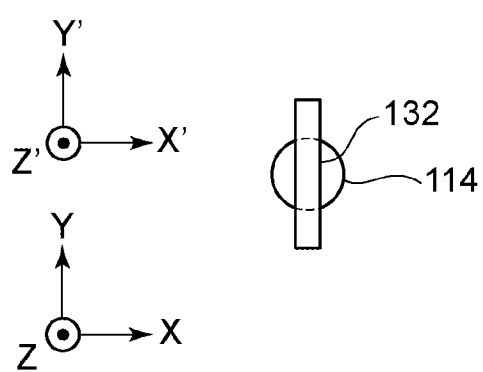

An example of the shape of the communication system 100 according to the present exemplary embodiment is described below with reference to FIGS. 2A to 2C. FIG. 2A is a perspective view of the communication system 100 in a three-dimensional coordinate system 200 based on the fixed base 110, and FIG. 2B is a side view of the communication system 100 in the coordinate system 200 (as viewed in the Y-axis direction of the coordinate system 200). FIG. 2C is a top view of the communication system 100 as viewed in the Z-axis direction. In FIGS. 2A to 2C, some constituent elements of the communication system 100 are not illustrated for the purpose of simplicity. In particular, in FIG. 2C, the constituent elements other than the power transmitting antenna 114 and the power receiving antenna 132 are not illustrated.

The fixed base 110 has a rotating mechanism 201 in addition to the constituent elements illustrated in FIG. 1. The rotating mechanism 201 rotates the rotary support base 120 about the axis extending in the Z-axis direction (rotates in the pan direction) by the power obtained from the drive unit 115. The axis of rotation of the rotating mechanism 201 passes through the substantial center of a ring formed by the power transmitting antenna 114. For this reason, even when the rotary support base 120 rotates, the power transmitting antenna 114 and the power receiving antenna 132 can at least partially overlap each other at all times, as viewed in the Z-axis direction. According to the present exemplary embodiment, the shape of "ring" fruited by the antenna is not limited to a strictly circular shape. The shape of the ring may be a closed curve, such as a polygonal shape or an elliptical shape. If the shape of the ring is a polygon, the center of the ring indicates the position of its centroid. Alternatively, the center of the ring formed by the outer periphery of the antenna may be the axis of rotation. Still alternatively, the center of the ring formed by the inner periphery of the antenna may be the axis of rotation.

The rotary support base 120 has a rotating mechanism 202 in addition to the constituent elements illustrated in FIG. 1. The rotating mechanism 202 rotates (rotates in the tilt direction) the rotary image capturing unit 130 about an axis substantially orthogonal to the axis of rotation of the rotating mechanism 201 by using the power obtained from the drive unit 134. Since the axis of rotation of the rotating mechanism 202 and the axis of rotation of the rotating mechanism 201 are substantially orthogonal to each other, the power transmitting antenna 114 and the power receiving antenna 132 at least partially overlap each other at all times as viewed in the Z-axis direction even when the rotary image capturing unit 130 rotates. FIGS. 2A to 2C illustrate an example in which the rotary image capturing unit 130 has a spherical shape. However, the shape of the rotary image capturing unit 130 is not limited thereto. The shape may be, for example, an egg shape, a tear shape, or a disk shape.

Before describing the rotating operation of the communication system 100, it is helpful to define a rotating coordinate system 210. In the rotating coordinate system 210, the direction of the axis of rotation of the rotating mechanism 202 is defined as the X-axis direction, the direction from the center of the rotary image capturing unit 130 toward the image capturing unit 133 is defined as the Z'-axis direction, and the direction in which a right-handed screw advances in accordance with the rotation from the Z'-axis to the X'-axis is defined as the Y'-axis direction.

The power receiving antenna 132 forms a loop surrounding the axis of rotation of the rotating mechanism 201. In addition, the power receiving antenna 132 forms part (a circular arc shape) of a ring, the center, or approximate center, of which lies on the axis of rotation of the rotating mechanism 202. That is, as viewed in the X'-axis direction, the power receiving antenna 132 has a ring shape from which part corresponding to the image capturing unit 133 is removed. For this reason, even when the rotary image capturing unit 130 rotates, the power transmitting antenna 114 and the power receiving antenna 132 at least partially overlap each other at all times as viewed in the Z-axis direction.

The rotating mechanism 202 is not directly connected to the rotating mechanism 201 but is connected via a rotary support base 120, and the rotating mechanism 201 and the rotating mechanism 202 can rotate independently. According to the present exemplary embodiment, the power receiving antenna 132 can rotate all around the axis extending in the Z-axis (360 degrees) together with the rotary support base 120. In addition, the power receiving antenna 132 can rotate all around the X'-axis together with the rotary image capturing unit 130. However, some embodiments are not limited thereto. The rotatable range of at least one of the rotary support base 120 and the rotary image capturing unit 130 may be limited. In addition, the rotating mechanism of the communication system 100 is not limited to the example illustrated in FIGS. 2A to 2C. For example, the rotating mechanism may be unilaterally supported or bilaterally supported. Furthermore, the rotating mechanism may have a rod serving as a rotation shaft or may be a rotating mechanism using a rolling bearing or a slide bearing. That is, according to the present exemplary embodiment, each of the axis of rotation of the rotating mechanism 201 and the axis of rotation of the rotating mechanism 202 is a concept representing the center of the rotation operation. Accordingly, a physical shaft may or may not exist at the position of the axis.

Furthermore, the shape of the power receiving antenna 132 is not limited to that illustrated in FIGS. 2A to 2C. The power receiving antenna 132 is only required to form at least part of the shape of a ring as viewed in the X'-axis direction. For example, the power receiving antenna 132 may have an unbroken ring shape as viewed in the X'-axis direction or may have a circular arc shape having a length corresponding to the rotatable range of the rotary image capturing unit 130. FIGS. 2A to 2C illustrate an example in which the power receiving antenna 132 is set on the surface of the rotary image capturing unit 130. However, the location of the power receiving antenna 132 is not limited thereto. The power receiving antenna 132 may be mounted inside the rotary image capturing unit 130.

Figure 3A:
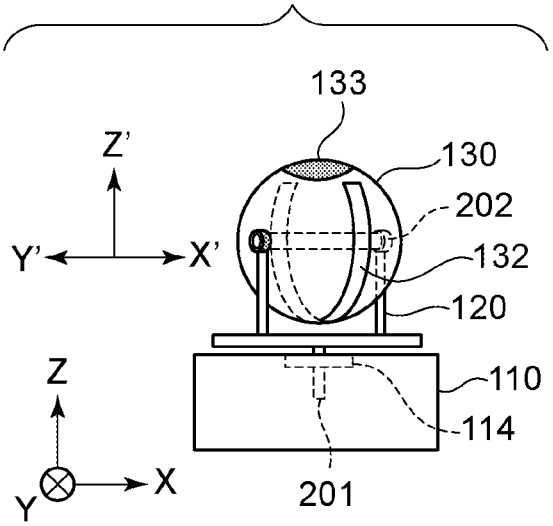
FIGS. 3A to 3D illustrate an example of the rotation operation performed by the communication system.
Figure 3B:
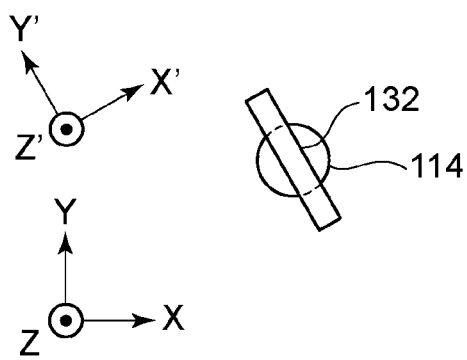

An example of a rotation operation performed by the communication system 100 is described below with reference to FIGS. 3A and 3B. FIGS. 3A and 3B are a side view and a top view of the communication system 100, respectively, after the rotary support base 120 is rotated about the axis extending in the Z-axis direction from the position illustrated in FIGS. 2A to 2C. As a result of the rotation of the rotating mechanism 201, as illustrated in FIG. 2A, the rotating mechanism 202, the rotary image capturing unit 130, the power receiving antenna 132, and the image capturing unit 133 rotate about the axis extending in the Z-axis direction together with the rotary support base 120. As illustrated in FIG. 2B, even when the rotary support base 120 rotates, the power receiving antenna 132 and the power transmitting antenna 114 at least partially overlap each other as viewed in the Z-axis direction and, thus, the power receiving antenna 132 and the power transmitting antenna 114 can be coupled by an electromagnetic field.

Figure 3C:
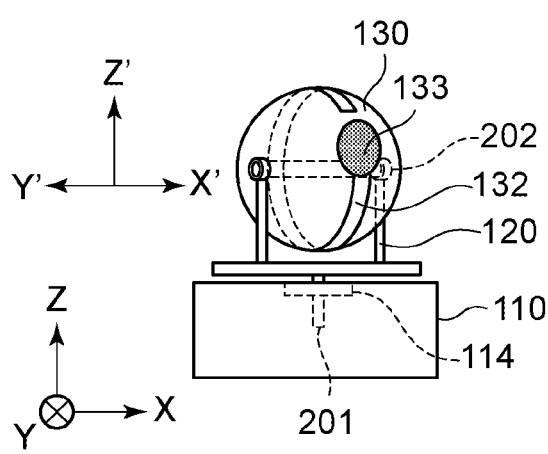
Figure 3D:
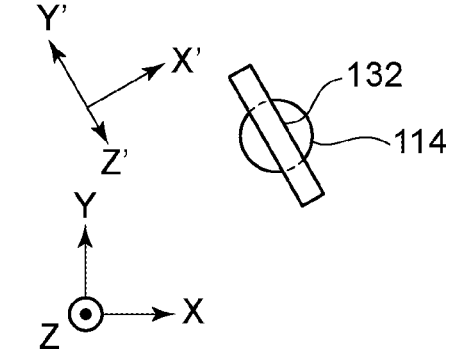

FIGS. 3C and 3D are a side view and a top view, respectively, after the rotary image capturing unit 130 is rotated about the axis extending in the X'-axis direction from the position illustrated in FIGS. 3A and 3B. As illustrated in FIG. 3C, as a result of the rotation of the rotating mechanism 202, the power receiving antenna 132 and the image capturing unit 133 rotate about the axis extending in the X'-axis direction together with the rotary image capturing unit 130. As illustrated in FIG. 3D, even when the rotary image capturing unit 130 rotates, the power receiving antenna 132 and the power transmitting antenna 114 at least partially overlap each other as viewed in the Z-axis direction and, thus, the power receiving antenna 132 and the power transmitting antenna 114 can be coupled by an electromagnetic field.

FIGS. 3A to 3D illustrate an example of the condition of the communication system 100 that changes with the rotation operation. Similarly, under other rotation conditions, the power receiving antenna 132 and the power transmitting antenna 114 are coupled by an electromagnetic field and, thus, the communication system 100 can perform wireless power transmission. However, the communication system 100 may have a configuration capable of temporarily entering a state in which wireless power transmission using an electromagnetic field cannot be performed between the power receiving antenna 132 and the power transmitting antenna 114.

Modification of System Structure

Figure 4:
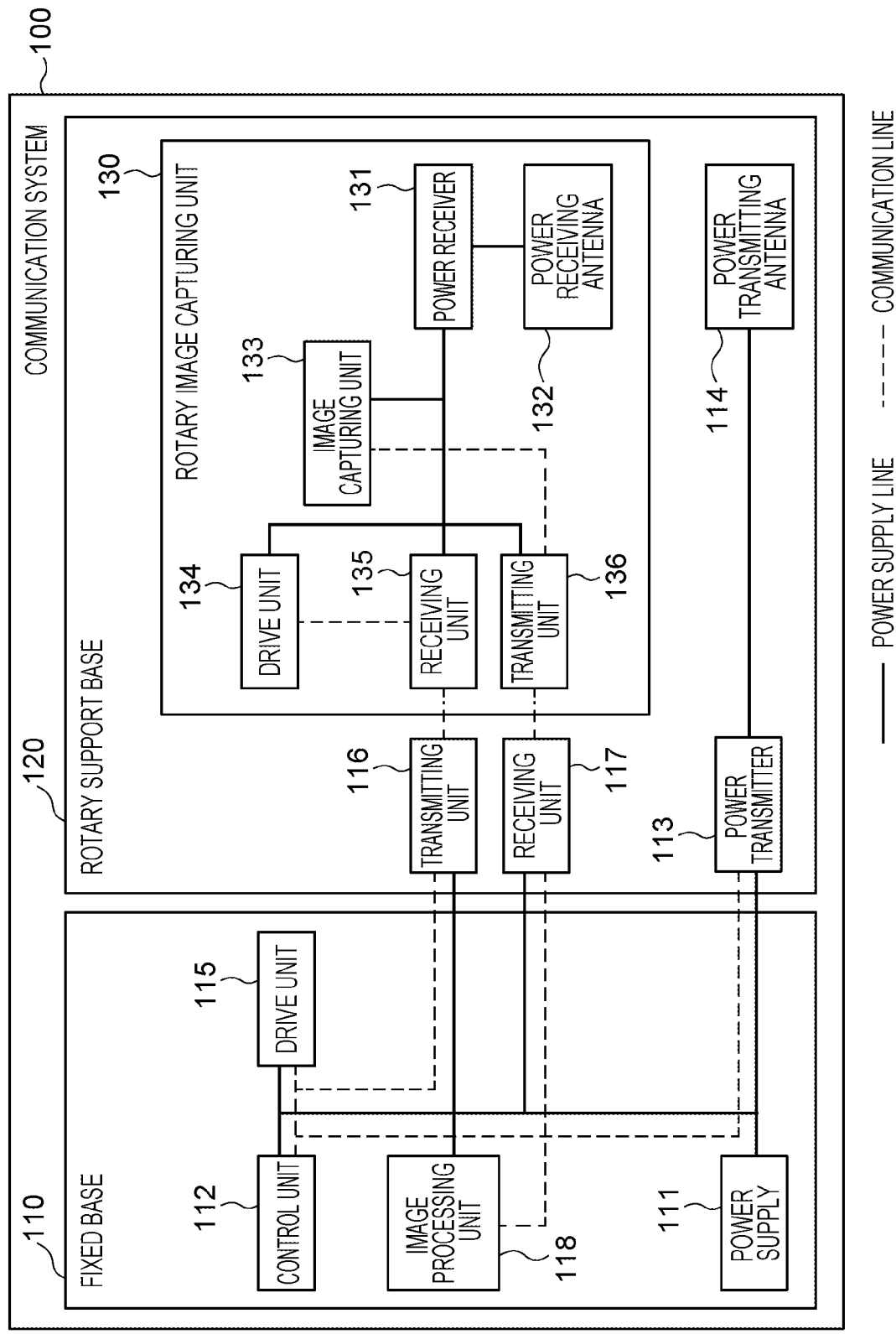
FIG. 4 is a block diagram illustrating the system configuration of a communication system.

While the above description has been made with particular reference to the power transmitting antenna 114 mounted on the fixed base 110, the location of the power transmitting antenna 114 is not limited thereto. A modification in which the power transmitting antenna 114 is mounted on the rotary support base 120 is described below. FIG. 4 illustrates the configuration of a communication system 100 according to the present modification. Hereinafter, a description is given focusing on portions that differ from the configuration illustrated in FIG. 1. In FIG. 4, the power transmitter 113, the power transmitting antenna 114, the transmitting unit 116, and the receiving unit 117 are mounted, not on the fixed base 110, but on the rotary support base 120.

Figure 5A:
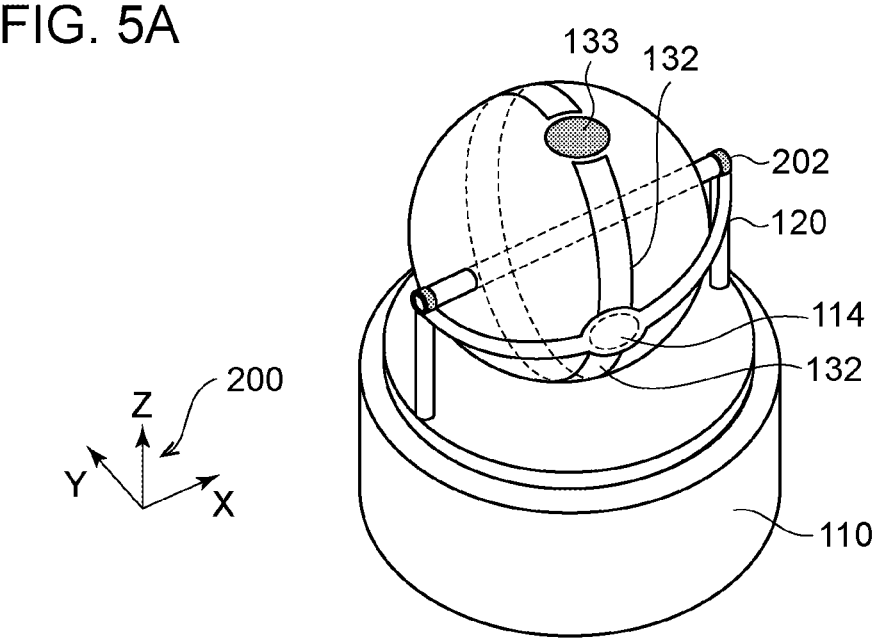
FIGS. 5A to 5C illustrate an example of the shape of the communication system.
Figure 5B:
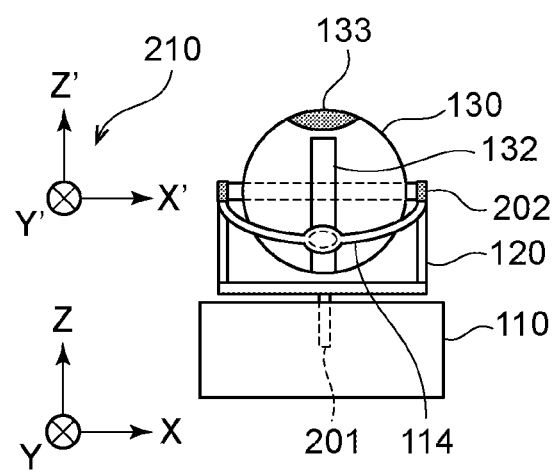
Figure 5C:
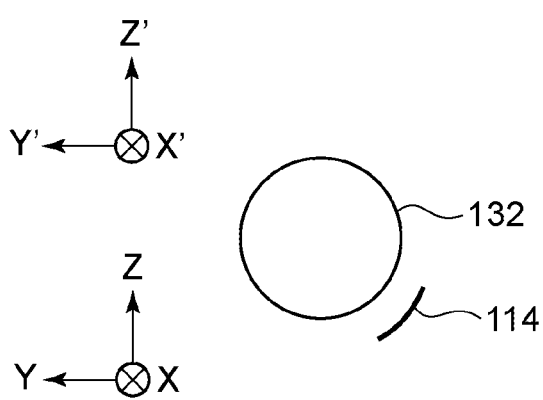

The shape of the communication system 100 according to the present modification is described below with reference to FIGS. 5A to 5C. FIG. 5A is a perspective view of the communication system 100. FIG. 5B is a side view of the communication system 100 as viewed in the Y-axis direction. FIG. 5C is a side view of the communication system 100 as viewed in the X-axis direction. Note that in FIG. 5C, the constituent elements other than the power transmitting antenna 114 and the power receiving antenna 132 are not illustrated. The location of the power transmitting antenna 114 and the location of the power receiving antenna 132 overlap each other as viewed in the X'-axis direction. For this reason, even when the rotary image capturing unit 130 is rotated about the X'-axis by the rotating mechanism 202, the power transmitting antenna 114 and the power receiving antenna 132 can be coupled by an electromagnetic field.

Note that the location of the power transmitting antenna 114 illustrated in FIGS. 5A to 5C is only an example, and the location is not limited thereto. The communication system 100 has a different structure so as to be capable of performing wireless power transmission using an electromagnetic field between the power transmitting antenna 114 and the power receiving antenna 132 even when the power transmitting antenna 114 rotates about the axis extending in the Z-axis direction and, in addition, the power receiving antenna 132 rotates about the X'-axis.

Wireless Data Communication

Figure 6A:
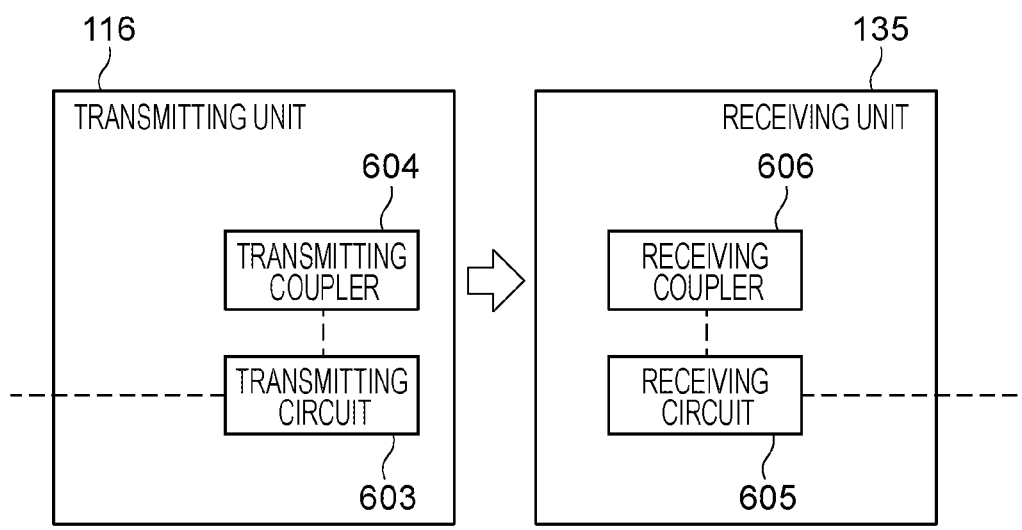
FIGS. 6A and 6B illustrate an example of the configurations of a transmitting unit and a receiving unit for performing wireless data communication.

The configuration of the communication system 100 for performing wireless power transmission has been described above. In contrast, the configuration of the communication system 100 for performing wireless data communication is described below. FIG. 6A illustrates the configuration of the transmitting unit 116 and the receiving unit 135 for providing wireless data communication in the communication system 100 illustrated in FIG. 1. Note that to provide wireless data communication, power transmission from the fixed base 110 to the rotary image capturing unit 130 may be performed wirelessly as described above or may be performed by wire. If power transmission is performed by wire, the power transmitter 113 and the power receiver 131 are connected by a cable. Alternatively, the power transmitter 113 and the power receiver 131 may be connected via a slip ring.

As illustrated in FIG. 6A, the transmitting unit 116 includes a transmitting circuit 603 and a transmitting coupler 604. The receiving unit 135 includes a receiving circuit 605 and a receiving coupler 606. The transmitting coupler 604 and the receiving coupler 606 are conductors that function as communication antennas for performing data communication. The transmitting circuit 603 and the receiving circuit 605 perform communication control for controlling wireless data communication based on electromagnetic field coupling between the transmitting coupler 604 and the receiving coupler 606. More specifically, the transmitting circuit 603 generates an electric signal under the control of the control unit 112 and transmits the electric signal from the transmitting coupler 604 to the receiving coupler 606 in accordance with a baseband method of transmitting an electric signal without modulation. The receiving circuit 605 outputs the electric signal received via the receiving coupler 606 to the drive unit 134 and the image capturing unit 133.

Figure 6B:
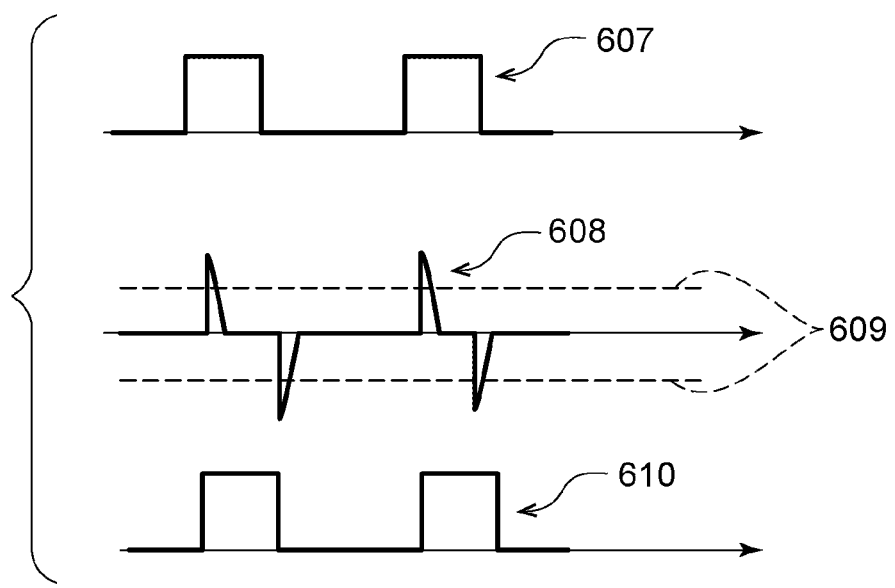

FIG. 6B illustrates a signal waveform in wireless data communication. The transmitting circuit 603 inputs, to the transmitting coupler 604, a digital signal 607 corresponding to data to be transmitted without modulation. In response to the input of the signal 607 to the transmitting coupler 604, a differentiated signal 608 is generated in the receiving coupler 606 by electromagnetic field coupling. The receiving circuit 605 restores a digital signal 610 by processing the differentiated signal 608 generated in the receiving coupler 606 with a comparator having a threshold 609. According to the present exemplary embodiment, the signal output from the transmitting circuit 603 is a binary digital signal of "1" or "0". However, some embodiments are not limited thereto. For example, a multi-level (two- or higher-level) signal which represents data by using the discrete voltage quantity may be employed.

Note that the wireless data communication method is not limited to the baseband method. For example, a carrier wave transmitted from the transmitting coupler 604 to the receiving coupler 606 may be modulated by an electric signal generated by the transmitting circuit 603 and, thus, carrier communication may be performed. In addition, the wireless data communication between the couplers may be performed by electric field coupling, magnetic field coupling, or both electric field coupling and magnetic field coupling. Hereinafter, a description is given mainly of wireless data communication based on differential transmission performed between the transmitting coupler 604 and the receiving coupler 606 each having a pair of electrodes. According to differential transmission, noise of data to be communicated can be reduced.

An example of the shape of a coupler used for performing wireless data communication is described below with reference to FIG. 7. In this case, power transmission is performed by wire. The transmitting coupler 604 is mounted at the position of the power transmitting antenna 114 illustrated in FIGS. 2A to 2C or FIGS. 5A to 5C, and the receiving coupler 606 is mounted at the position of the power receiving antenna 132. Note that the structure in which both data communication and power transmission are performed wirelessly is described below with reference to FIG. 12.

The transmitting coupler 604 includes electrodes 703 and 704 each formed as a pattern on a substrate 701, and the receiving coupler 606 includes electrodes 705 and 706 each formed as a pattern on a substrate 702. The transmitting circuit 603 inputs, to the electrode 704, a signal having an opposite phase to a signal input to the electrode 703 to perform wireless data communication based on differential transmission. In accordance with the input, signals having phases opposite to each other are transmitted to the electrodes 705 and 706 by electromagnetic field coupling. The electrode 703 is mainly coupled to the electrode 705 by an electromagnetic field, and the electrode 704 is mainly coupled to the electrode 706 by an electromagnetic field. That is, each of the electrodes functions as a communication antenna for performing wireless data communication.

The center of the electrode 703 substantially coincides with the center of the ring formed by the electrode 704, and the axis of rotation of the rotary support base 120 (the axis of rotation extending in the Z-axis direction) passes through the substantial center of the ring formed by the electrode 704. For this reason, even when the receiving coupler 606 rotates about the axis extending in the Z-axis direction together with the rotary support base 120, the electrodes 703 and 705 at least partially overlap each other at all times as viewed in the Z-axis direction. In addition, the electrodes 704 and 706 at least partially overlap each other at all times as viewed in the Z-axis direction.

Furthermore, the center of the ring formed by the electrode 705 coincides, or approximately coincides, with the center of the ring formed by the electrode 706, and the axis of rotation of the rotary image capturing unit 130 (the axis of rotation extending in the X'-axis direction) passes through the center, or the approximate center, of the ring formed by the electrode 705. For this reason, even when the receiving coupler 606 rotates about the axis extending in the X'-axis direction together with the rotary image capturing unit 130, the electrodes 703 and 705 at least partially overlap each other at all times as viewed in the Z-axis direction. In addition, the electrodes 704 and 706 at least partially overlap each other at all times as viewed in the Z-axis direction. That is, the communication system 100 can rotate in the pan direction and the tilt direction with the transmitting coupler 604 and the receiving coupler 606 coupled to each other by the electromagnetic field. In this way, the communication system 100 can perform wireless data communication.

Note that the electrode 704 included in the transmitting coupler 604 is only required to form at least part of the shape of the ring. For example, the electrode 704 may have a circular arc shape or have a slit extending in the radial direction of the ring. In addition, the shape of the electrode 703 is not limited to a circular shape. The electrode 703 may form at least part of the shape of the ring. Similarly, the electrode 705 and the electrode 706 of the receiving coupler 606 are only required to form at least part of the ring shape as viewed in the X'-axis direction. For example, each of the electrode 705 and the electrode 706 may form an unbroken ring shape as viewed in the X'-axis direction or may form a circular arc shape having a length corresponding to the rotatable range of the rotary image capturing unit 130.

Figure 7:
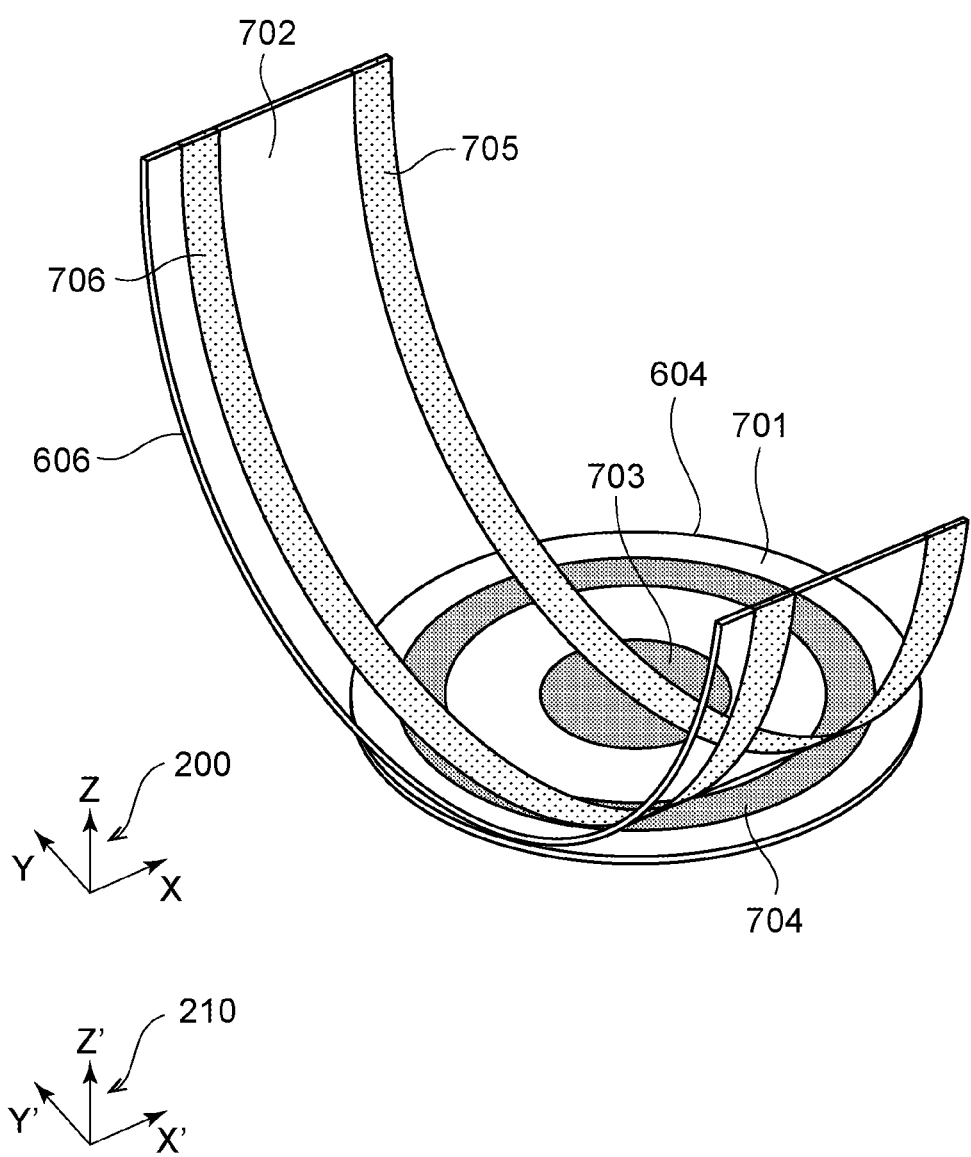
FIG. 7 illustrates an example of the shape of a coupler for performing wireless data communication.
Figure 8A:
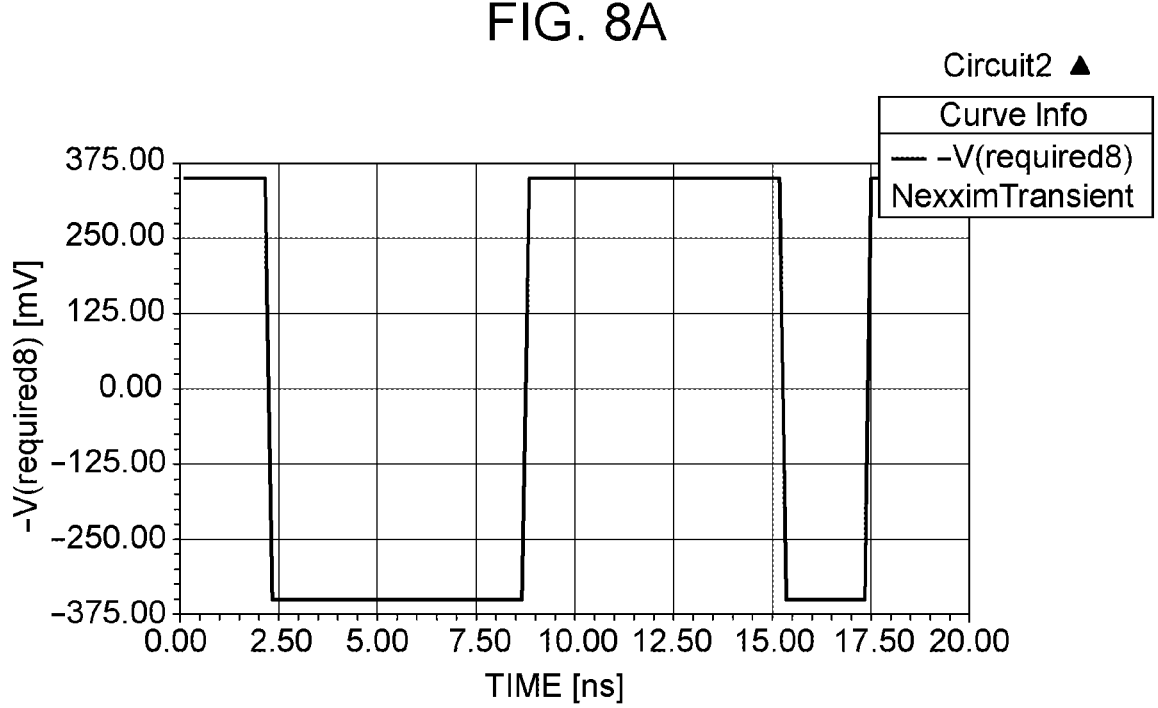
FIGS. 8A and 8B illustrate a simulation result of a signal waveform in wireless data communication.
Figure 8B:
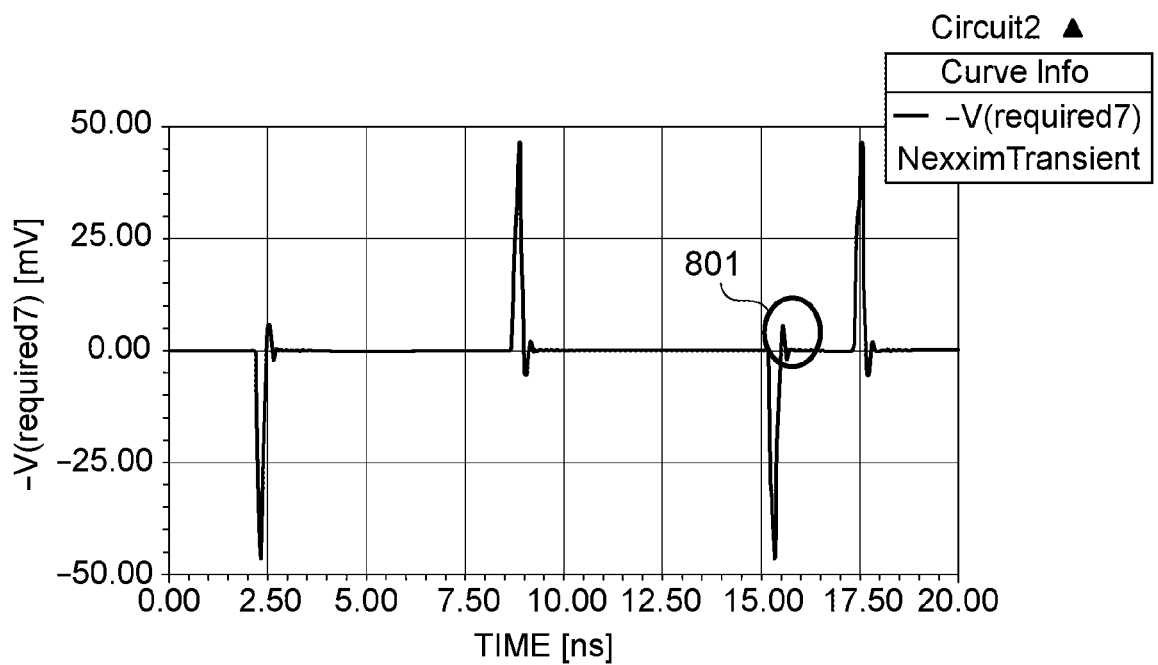

FIGS. 8A and 8B illustrate a simulation result of a signal transmitted between the transmitting coupler 604 and the receiving coupler 606 having the configuration illustrated in FIG. 7. FIG. 8A illustrates the waveform of a signal input to the transmitting coupler 604, and FIG. 8B illustrates the waveform of a signal output from the receiving coupler 606. As can be seen from FIGS. 8A and 8B, when the input signal rises and falls, the corresponding differentiated waveform is output from the receiving coupler 606. In addition, although ringing occurs in a portion 801 of the signal waveform output from the receiving coupler 606, the amplitude is sufficiently small with respect to the differentiated waveform signal corresponding to the rise and fall of the input signal. More specifically, the peak voltage of the signal illustrated in FIG. 8B is about 45 mV, while the voltage of the ringing portion is about 5 mV Therefore, the digital signal transmitted from the transmitting unit 116 can be restored by the receiving unit 135 that performs the processing of the signal illustrated in FIG. 8B by using a comparator having an appropriate threshold (for example, 25 my).

While the configuration in which the data communication between the transmitting unit 116 and the receiving unit 135 is made wireless has been described above, the data communication between the receiving unit 117 and the transmitting unit 136 can be made wireless in a similar manner. For example, the transmitting unit 136 may input a signal corresponding to image data based on the image captured by the image capturing unit 133 to a coupler having the same structure as the receiving coupler 606 illustrated in FIG. 7. At this time, the receiving unit 117 may receive a signal output from a coupler having the same structure as the transmitting coupler 604. That is, the receiving coupler 606 illustrated in FIG. 7 may function as a communication antenna for transmission, and the transmitting coupler 604 may function as a communication antenna for reception.

Note that wireless data communication performed in the communication system 100 is not limited to differential transmission. The wireless data communication may be performed on the basis of single-ended transmission. In this case, the transmitting coupler 604 may include only one of the electrodes 703 and 704, and the receiving coupler 606 may include only one of the electrodes 705 and 706. Alternatively, bidirectional communication may be performed in the communication system 100 by the transmitting unit 116 inputting a signal to the electrode 703 and the transmitting unit 136 inputting a signal to the electrode 706. Note that the number of couplers included in the communication system 100 is not limited to the above example.

Modification of System Structure

In the above description, the electrode included in the transmitting coupler 604 and the electrode included in the receiving coupler 606 at least partially overlap each other as viewed in the Z-axis direction so as to cause electromagnetic field coupling. However, a positional relationship between the electrodes is not limited thereto. A modification is described below in which the electrode included in the transmitting coupler 604 and the electrode included in the receiving coupler 606 at least partially overlap with each other as viewed in the X'-axis direction so as to cause electromagnetic field coupling.

Figure 9A:
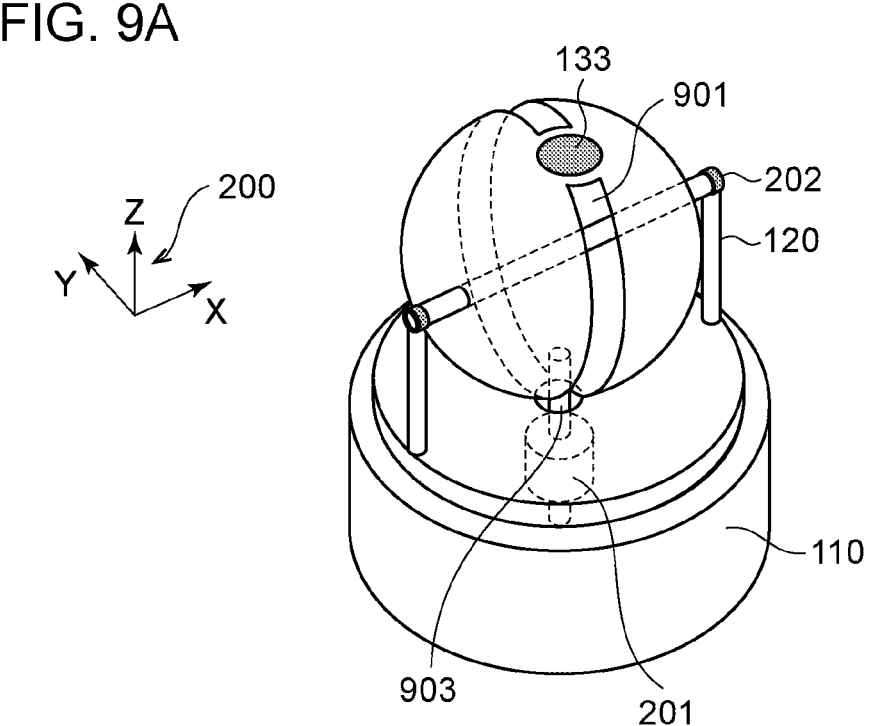
FIGS. 9A and 9B illustrate an example of the shape of a communication system.
Figure 9B:
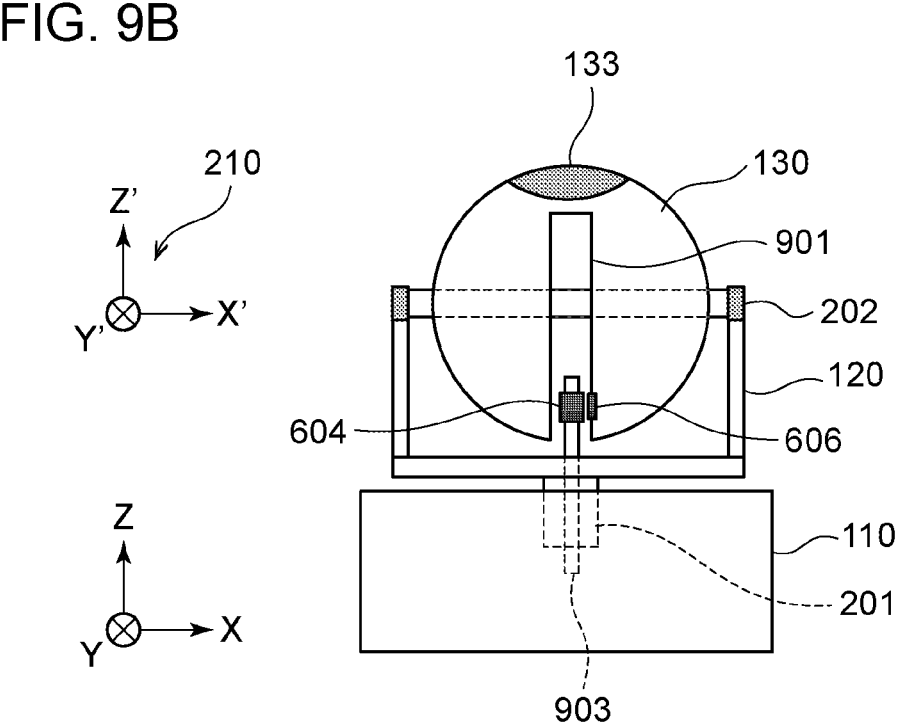

FIGS. 9A and 9B illustrate the structure of a communication system 100 according to the present modification. Hereinafter, a description is given mainly of a portion that differs from the structure illustrated in FIGS. 2A to 2C. FIG. 9A is a perspective view of the communication system 100, and FIG. 9B is a side view of the communication system 100 as viewed in the Y-axis direction. In the configuration illustrated in FIGS. 9A and 9B the rotary image capturing unit 130 has a groove 901 formed therein. The groove 901 extends in the circumferential direction around the Y-axis. The groove 901 has a width of several millimeters. The receiving coupler 606 is mounted on an inner side surface of the groove 901. In addition, the rotating mechanism 201 has a cylindrical shape, and a shaft 903 is mounted on the fixed base 110 so as to pass through the cylindrical rotating mechanism 201. Furthermore, a transmitting coupler 604 is provided so as to be wound around the shaft 903 and face the receiving coupler 606.

Figure 10A:
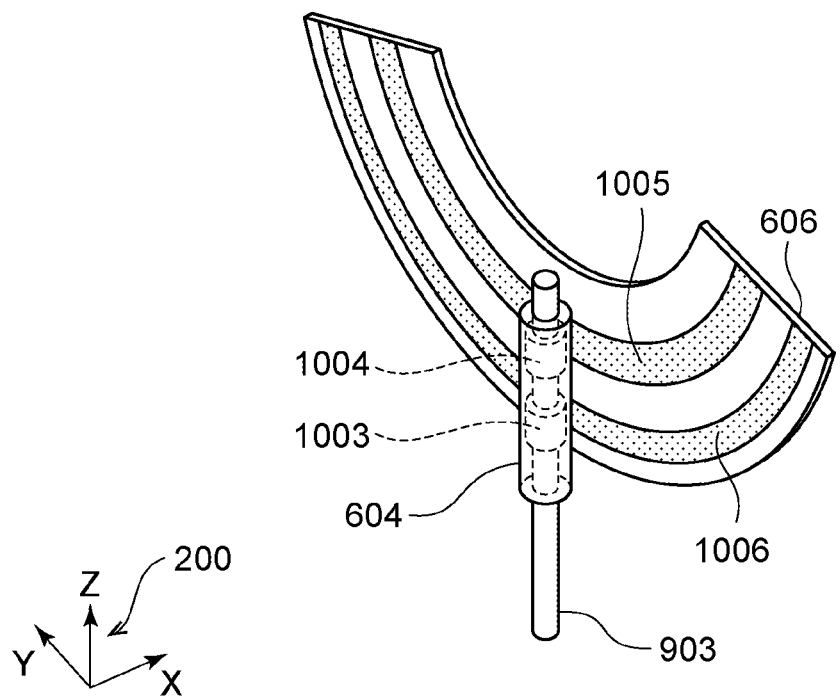
FIGS. 10A and 10B illustrate an example of the shape of a coupler for performing wireless data communication.
Figure 10B:
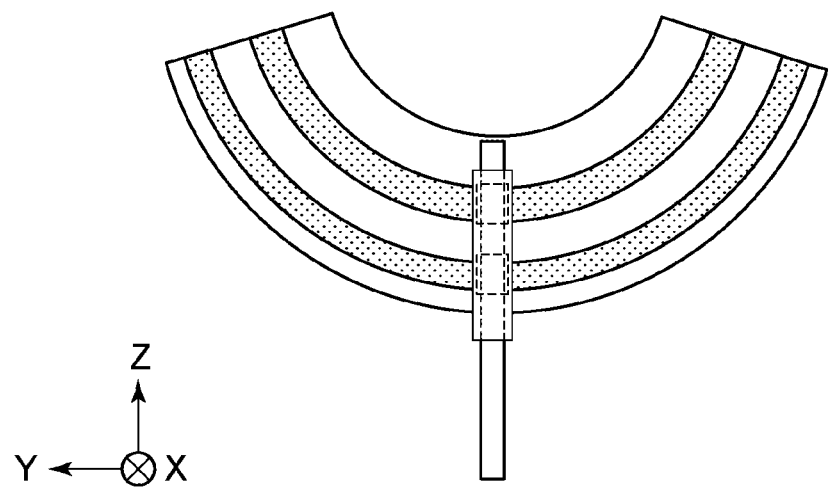

FIGS. 10A and 10B are enlarged views of a coupler portion of the structure according to the present modification. FIG. 10A is a perspective view of the coupler portion, and FIG. 10B is a side view of the coupler portion as viewed in the X-axis direction. To perform wireless data communication based on differential transmission, the transmitting coupler 604 includes an electrode 1003 and an electrode 1004, and the receiving coupler 606 includes an electrode 1005 and an electrode 1006. The electrode 1003 is mainly coupled to the electrode 1006 by an electromagnetic field, and the electrode 1004 is mainly coupled to the electrode 1005 by an electromagnetic field.

The center of the electrode 1003 substantially coincides with the center of the ring formed by the electrode 1004, and the axis of rotation of the rotary support base 120 (the axis of rotation extending in the Z-axis direction) passes through the substantial center of the ring formed by the electrode 1004. For this reason, even when the receiving coupler 606 rotates about the axis extending in the Z-axis direction together with the rotary support base 120, the electrode 1003 and the electrode 1005 at least partially overlap each other at all times as viewed in the X'-axis direction. In addition, the electrode 1004 and the electrode 1006 at least partially overlap each other at all times as viewed from the axial direction. Note that the shaft 903 may rotate about the Z-axis with the rotation of the rotary support base 120.

In addition, the center of the ring formed by the electrode 1005 and the center of the ring formed by the electrode 1006 substantially coincide with each other, and the axis of rotation of the rotary image capturing unit 130 (the axis of rotation extending in the X-axis direction) passes through the substantial center of the ring formed by the electrode 1005. For this reason, even when the receiving coupler 606 rotates about the axis extending in the X'-axis direction together with the rotary image capturing unit 130, the electrodes 1003 and 1005 at least partially overlap each other at all times as viewed in the X'-axis direction, and the electrodes 1004 and 1006 at least partially overlap each other at all times as viewed in the axial direction. That is, the communication system 100 can rotate in the pan direction and the tilt direction with the transmitting coupler 604 and the receiving coupler 606 coupled to each other by an electromagnetic field. In this way, the communication system 100 can perform wireless data communication.

Note that each of the electrode 1003 and the electrode 1004 included in the transmitting coupler 604 is only required to form at least part of a ring shape. That is, these electrodes need not be wound around the entire circumference of the shaft 903. In addition, each of the electrode 1005 and the electrode 1006 included in the receiving coupler 606 is only required to form at least part of a ring shape as viewed in the X-axis direction. For example, each of the electrode 1005 and the electrode 1006 may form an unbroken ring as viewed in the X'-axis direction or may form a circular arc shape having a length corresponding to the rotatable range of the rotary image capturing unit 130.

Figure 11A:
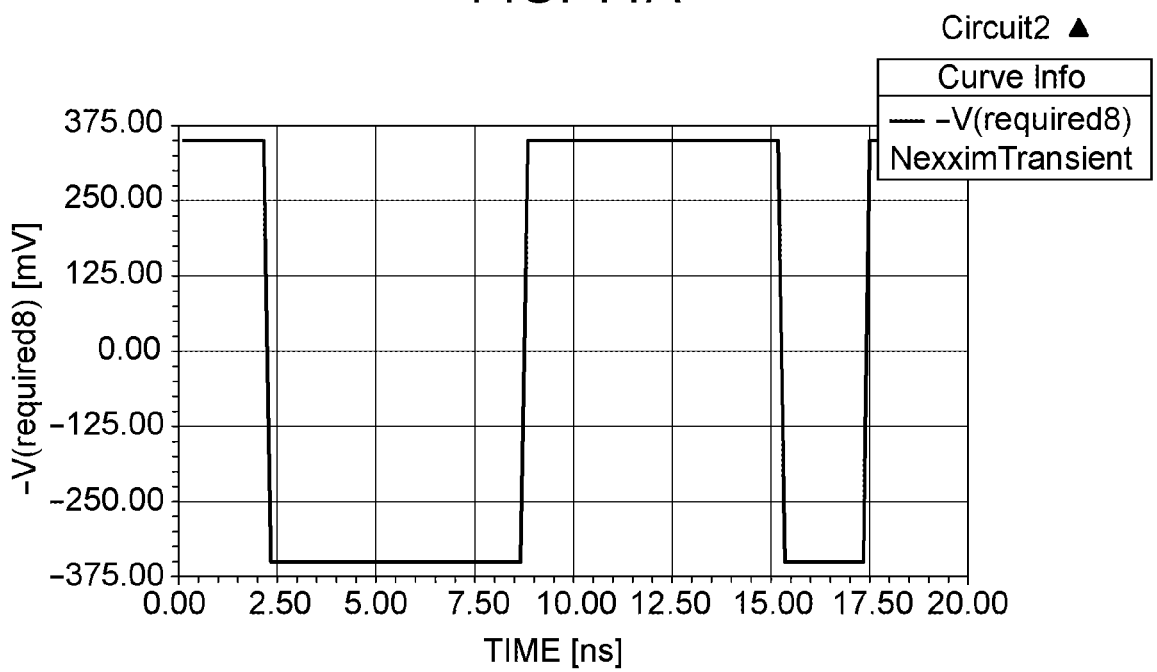
FIGS. 11A and 11B illustrate a simulation result of a signal waveform in wireless data communication.
Figure 11B:
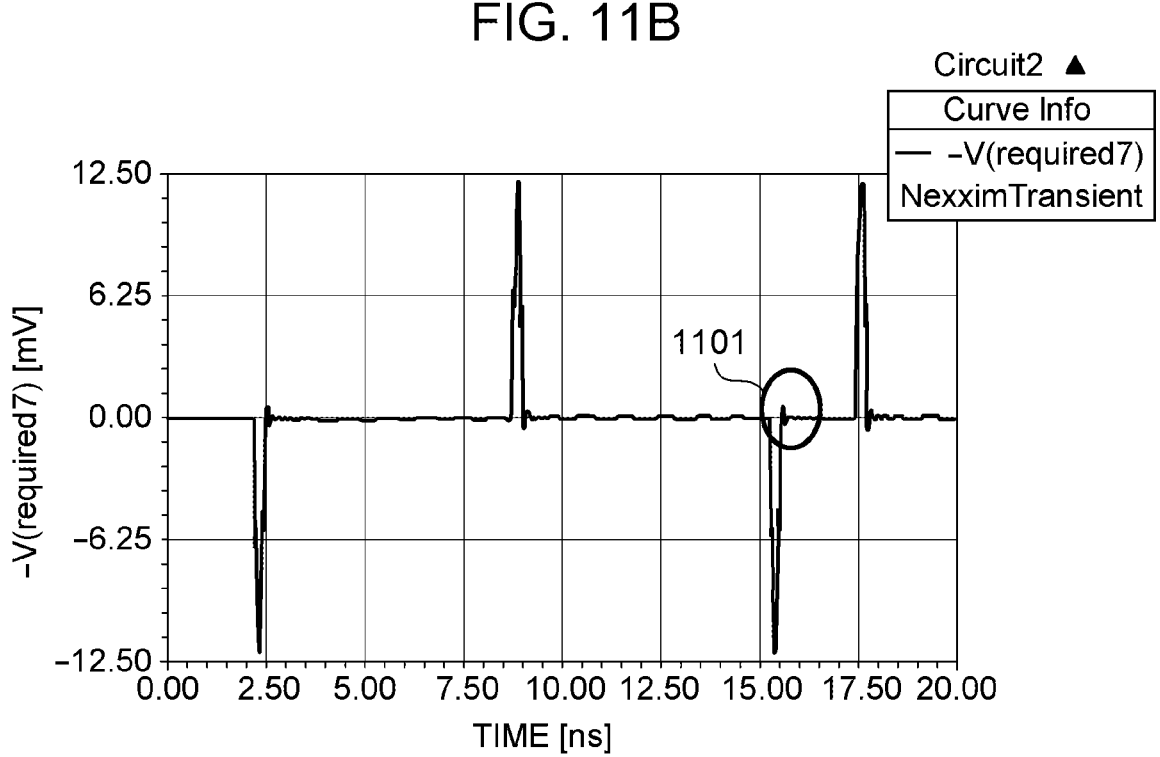

FIGS. 11A and 11B illustrate a simulation result of a signal transmitted between the transmitting coupler 604 and the receiving coupler 606 having the configuration illustrated in FIGS. 10A and 10B. FIG. 11A illustrates the waveform of a signal input to the transmitting coupler 604, and FIG. 11B illustrates the waveform of a signal output from the receiving coupler 606. As can be seen from FIGS. 11A and 11B when the input signal rises and falls, the corresponding differentiated waveform is output from the receiving coupler 606. In addition, although ringing occurs in a portion 1101 of the signal waveform output from the receiving coupler 606, the amplitude is sufficiently small with respect to the differentiated waveform signal corresponding to the rise and fall of the input signal. More specifically, the peak voltage of the signal illustrated in FIG. 11B is about 12 mV, while the voltage of the ringing portion is about 1 my. Therefore, the digital signal transmitted from the transmitting unit 116 can be restored by the receiving unit 135 that performs the processing of the signal illustrated in FIG. 11B by using a comparator having an appropriate threshold (for example, 10 mV).

Note that, similarly to the structure of the coupler described in FIG. 7, the communication direction of the coupler described in FIGS. 10A and 10B is not limited to any particular direction. That is, the receiving coupler 606 illustrated in FIGS. 10A and 10B may function as a communication antenna for transmission, and the transmitting coupler 604 may function as a communication antenna for reception. In addition, if wireless data communication in the communication system 100 is performed on the basis of single-ended transmission, the transmitting coupler 604 may have only one of the electrode 1003 and the electrode 1004, and the receiving coupler 606 may have only one of the electrode 1005 and the electrode 1006. Furthermore, bidirectional communication in the communication system 100 may be performed by the transmitting unit 116 that inputs a signal to the electrode 1003 and the transmitting unit 136 that inputs a signal to the electrode 1005.

The modification of the structure of the transmitting coupler 604 and the receiving coupler 606 serving as communication antennas for enabling wireless data communication has been described above with reference to FIGS. 9A and 9B and FIGS. 10A and 10B. However, an object to which this structure is applied is not limited to the communication antenna, and the above-described modification may be applied to the structure of the power transmitting antenna 114 and the power receiving antenna 132 for enabling wireless power transmission.

Parallel Use of Wireless Power Transmission and Wireless Data Communication

An example of the shape of an antenna for using both wireless data communication and wireless power transmission in the communication system 100 illustrated in FIG. 1 is described below with reference to FIG. 12. The fixed base 110 has a substrate 1301 mounted thereon. The substrate 1301 has, as a pattern formed thereon, a power transmitting antenna 114, electrodes 1304 and 1305 that form a transmitting coupler included in the transmitting unit 116, and electrodes 1306 and 1307 that form a receiving coupler included in the receiving unit 117. The rotary image capturing unit 130 has a substrate 1302 mounted thereon. The substrate 1302 has, arranged thereon, the power receiving antenna 132, electrodes 1309 and 1310 that form a receiving coupler included in the receiving unit 135, and electrodes 1311 and 1312 that form a transmitting coupler included in the transmitting unit 136.

Figure 12:
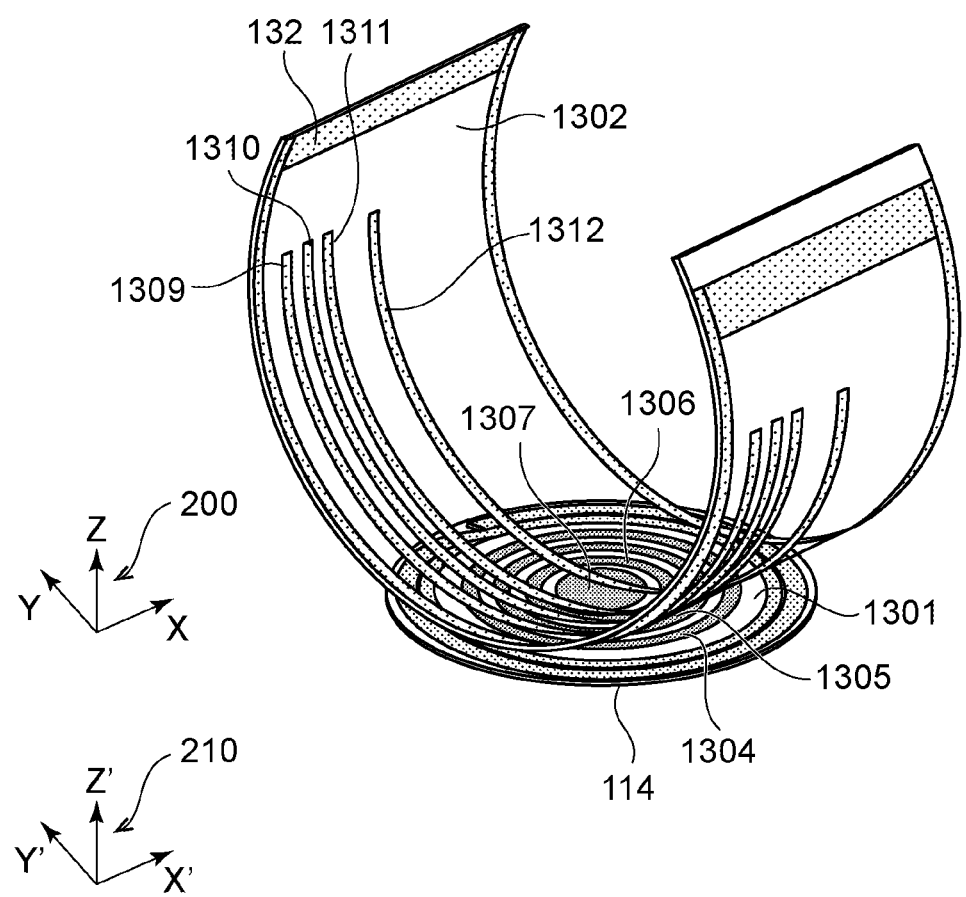
FIG. 12 illustrates an example of an antenna for performing wireless power transmission and wireless data communication.

As illustrated in FIG. 12, each of the power transmitting antenna 114, the electrode 1304, the electrode 1305, and the electrode 1306 has a shape of at least part of a ring, the center of which substantially lies on the axis of rotation of the rotary support base 120 as viewed in the Z-axis direction. In addition, each of the power receiving antenna 132, the electrode 1309, the electrode 1310, the electrode 1311, and the electrode 1312 forms at least part of a ring, the center of which substantially lies on the axis of rotation of the rotary image capturing unit 130 as viewed in the X'-axis direction. Note that the shape of the electrode 1307 is not limited to a circular shape. For example, the shape may be a part of a ring that is concentric with the power transmitting antenna 114.

The electrode 1304 and the electrode 1309 at least partially overlap each other as viewed in the Z-axis direction and are coupled by an electromagnetic field. This also applies to the electrode 1305 and the electrode 1310, the electrode 1306 and the electrode 1311, and the electrode 1307 and the electrode 1312. Furthermore, the power transmitting antenna 114 and the power receiving antenna 132 at least partially overlap with each other as viewed in the Z-axis direction and are coupled by an electromagnetic field. Such a positional relationship between the transmission/receiving coupler and the power transmission/reception antenna is maintained even when the substrate 1302 rotates about the axis extending in the Z-axis direction together with the rotary support base 120 and even when the substrate 1302 rotates about the axis extending in the X'-axis direction together with the rotary image capturing unit 130.

At this time, the transmitting unit 116 and the receiving unit 135 control wireless data communication based on electromagnetic field coupling. In addition, the receiving unit 117 and the transmitting unit 136 control wireless data communication based on electromagnetic field coupling, and the power transmitter 113 and the power receiver 131 control wireless power transmission based on electromagnetic field coupling. In this manner, the communication system 100 can perform wireless power transmission and bidirectional wireless data communication while rotating about two axes extending in the pan direction and the tilt direction.

In the structure illustrated in FIG. 12, each of the electrodes 1304, 1305, and 1306 have a slit extending in the radial direction so as not to form a continuous loop. Thus, a current corresponding to a magnetic field generated by the power transmitting antenna 114 for wireless power transmission can be prevented from flowing to the electrode. As a result, noise in wireless data communication can be reduced, and the wireless power transmission efficiency can be improved. However, when, for example, power transmission not mainly using magnetic field coupling (power transmission based on electric field coupling or the like) is performed, each of the electrodes may form a loop.

In the example illustrated in FIG. 12, the antenna for power transmission, the transmitting coupler, and the receiving coupler are mounted on the same substrate for the purpose of reducing the size of the system. However, at least one of the antenna for power transmission, the transmitting coupler, and the receiving coupler may be mounted on a different substrate. Furthermore, the antenna for power transmission and the antenna for data communication may be formed on an FR4 (Flame Retardant Type 4) substrate or may be formed on, for example, a Teflon® substrate, a ceramic substrate, or a flexible substrate. Still furthermore, the antenna need not be formed on the substrate but may be formed only of a plate-like or linear conductor.

In the example illustrated in FIG. 12, the transmitting coupler and the receiving coupler are mounted inside the antenna for power transmission as viewed in the Z-axis direction. However, the locations of the transmitting coupler and the receiving coupler are not limited thereto. At least one of the transmitting coupler and the receiving coupler may be mounted outside the antenna for power transmission. In addition, in the configuration illustrated in FIG. 12, the locations of the transmitting coupler and the receiving coupler may be exchanged. Furthermore, a power receiver may be mounted on the fixed base 110, and a power transmitter may be mounted on the rotary image capturing unit 130 so that an antenna having the same shape as the power transmitting antenna 114 illustrated in FIG. 12 may be used as an antenna for power reception and an antenna having the same shape as the power receiving antenna 132 may be used as an antenna for power transmission.

Furthermore, in the example illustrated in FIG. 12, the substrate 1301 is disposed at the position of the power transmitting antenna 114 illustrated in FIGS. 2A to 2C, and the substrate 1302 is disposed at the position of the power receiving antenna 132 illustrated in FIGS. 2A to 2C. However, some embodiments are not limited to the configuration. For example, the substrate 1301 may be disposed at the position of the power transmitting antenna 114 illustrated in FIGS. 5A to 5C, and the substrate 1302 may be disposed at the position of the power receiving antenna 132 illustrated in FIGS. 5A to 5C. Furthermore, the transmitting coupler, the receiving coupler, and the power transmitting antenna may be disposed at the position of the transmitting coupler 604 illustrated in FIGS. 9A and 9B, and the transmitting coupler, the receiving coupler, and the power receiving antenna may be disposed at the position of the receiving coupler 606 illustrated in FIGS. 9A and 9B.

As described above, the communication system 100 according to the present exemplary embodiment includes a first antenna (for example, the power transmitting antenna 114 or the electrode of the transmitting coupler 604) that forms at least part of the shape of a first ring. In addition, the communication system 100 includes a second antenna that forms at least part of the shape of a second ring and that is capable of being coupled to the first antenna (for example, the power receiving antenna 132 or the electrode of the receiving coupler 606) by an electromagnetic field. Furthermore, the communication system 100 includes a drive unit 115 for rotating at least one of the first antenna and the second antenna about a first axis (for example, the axis extending in the Z-axis direction) that passes through the center, or the approximate center, of the first ring. Still furthermore, the communication system 100 includes the drive unit 134 for rotating at least one of the first antenna and the second antenna about a second axis (for example, the axis extending in the X'-axis direction) that passes through the center, or the approximate center, of the second ring and that is substantially orthogonal to the first axis.

According to the configuration described above, the plurality of antennas can be relatively rotated about two or more axes while maintaining electromagnetic field coupling between the plurality of antennas. In this manner, the movable range of the communication system 100 that performs wireless power transmission, wireless data communication, or both can be expanded.

In addition, the communication system 100 having each of the above-described configurations can be manufactured, for example, by the following method. That is, the rotary support base 120 is first attached to a fixed base 110 serving as a base so as to be rotatable about a first axis. Thereafter, the rotary image capturing unit 130 is attached to the rotary support base 120 so as to be rotatable about a second axis substantially orthogonal to the first axis. Furthermore, the first antenna is mounted on one of the fixed base 110 and the rotary support base 120. Thereafter, a second antenna that can be coupled to the first antenna by an electromagnetic field is mounted on the rotary image capturing unit 130. By using the communication system 100 produced in this manner, a plurality of antennas coupled to each other by an electromagnetic field can be relatively rotated about two or more axes, as described above. Note that the order in which the members are attached is not limited to the above-described example. The order can be changed in any way.

While the present exemplary embodiment has been described with reference to the case where the communication system 100 rotates about two axes, that is, the axis extending in the pan direction and the axis extending in the tilt direction, the rotation direction is not limited thereto. For example, according to the antenna arrangement illustrated in FIGS. 5A to 5C, even when the rotary image capturing unit 130 rotates about the axis extending in the roll direction (the Ye-axis direction), the electromagnetic field coupling between the antennas can be maintained. Alternatively, the communication system 100 may rotate about three or more axes. Furthermore, according to the present exemplary embodiment, the rotation is performed about an axis of rotation passing through the center of a ring formed by the antenna. However, the axis of rotation is not limited to that passing through the center of the ring. Any axis of rotation can be employed that passes through the location at which the degree of coupling between the antennas falls within a predetermined range even when the antennas rotate.

According to the above-described exemplary embodiment, each of the plurality of antennas can be relatively rotated about two or more axes while maintaining electromagnetic field coupling between the antennas.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-067477, which was filed on Mar. 29, 2019 and which is hereby incorporated by reference herein in its entirety.

What is claimed is:

1. A wireless system comprising:
    a first antenna configured to form at least part of a shape of a first ring;
    a second antenna configured to form at least part of a shape of a second ring, the second antenna being capable of being coupled to the first antenna by an electromagnetic field;
    a first rotation control unit configured to rotate at least one of the first antenna and the second antenna about a first axis that passes through a substantial center of the first ring; and
    a second rotation control unit configured to rotate at least one of the first antenna and the second antenna about a second axis that passes through a substantial center of the second ring and that is substantially orthogonal to the first axis.

2. The wireless system according to claim 1, wherein the first antenna and the second antenna at least partially overlap each other as viewed in a direction of the first axis or a direction of the second axis.

3. The wireless system according to claim 1, wherein the first rotation control unit is capable of rotating at least one of the first antenna and the second antenna 360 degrees, and
    wherein the second rotation control unit is capable of rotating at least one of the first antenna and the second antenna 360 degrees.

4. The wireless system according to claim 1, further comprising:
    a power transmission control unit configured to control wireless power transmission based on electromagnetic field coupling between the first antenna and the second antenna.

5. The wireless system according to claim 1, further comprising:
    a communication control unit configured to control wireless data communication based on electromagnetic field coupling between the first antenna and the second antenna.

6. The wireless system according to claim 1, further comprising:
    a third antenna; and
    a fourth antenna capable of being coupled to the third antenna by an electromagnetic field,
    wherein the first rotation control unit rotates at least one of the third antenna and the fourth antenna about the first axis,
    and
    wherein the second rotation control unit rotates at least one of the third antenna and the fourth antenna about the second axis.

7. The wireless system according to claim 6, wherein the third antenna forms at least part of a shape of a third ring, a substantial center of which lies on the first axis, and
    wherein the fourth antenna forms at least part of a shape of a fourth ring, a substantial center of which lies on the second axis.

8. The wireless system according to claim 6, wherein the first antenna and the third antenna are mounted on the same substrate, and
    wherein the second antenna and the fourth antenna are mounted on the same substrate.

9. The wireless system according to claim 6, further comprising:
    a communication control unit configured to control wireless data communication based on differential transmission by transmitting, between the third antenna and the fourth antenna, a signal having a phase opposite to a phase of a signal transmitted between the first antenna and the second antenna by electromagnetic field coupling.

10. The wireless system according to claim 6, further comprising:
    a communication control unit configured to control wireless data communication based on electromagnetic field coupling between the first antenna and the second antenna; and
    a power transmission control unit configured to control wireless power transmission based on electromagnetic field coupling between the third antenna and the fourth antenna.

11. The wireless system according to claim 5, wherein the first antenna is included in a first portion of an image capturing apparatus,
    the second antenna is included in a second portion of the image capturing apparatus, and
    the communication control unit controls the wireless data communication for transmitting image data acquired by the image capturing apparatus.

12. The wireless system according to claim 1, further comprising:
    a base unit having the first antenna mounted thereon;
    a first rotary unit rotatable about the first axis with respect to the base unit under the control of the first rotation control unit; and a second rotary unit having the second antenna mounted thereon, the second rotary unit being capable of rotating about the second axis with respect to the first rotary unit under the control of the second rotation control unit.

13. The wireless system according to claim 1, wherein the first antenna has one of a circular shape and a circular arc shape, the substantial center of which lies on the first axis, and
wherein the second antenna has one of a circular shape and a circular arc shape, the substantial center of which lies on the second axis.

14. The wireless system according to claim 1, wherein the first antenna has one of an elliptical shape and a polygon shape, the substantial center of which lies on the first axis, and
wherein the second antenna has one of an elliptical shape and a polygon shape, the substantial center of which lies on the second axis.

15. A wireless system comprising:
a base unit;
a first rotary unit rotatable about a first axis with respect to the base unit;
a second rotary unit rotatable about a second axis with respect to the first rotary unit, the second axis being substantially orthogonal to the first axis;
a first antenna; and
a second antenna capable of being coupled to the first antenna by an electromagnetic field, the second antenna being mounted on the second rotary unit.

16. The wireless system according to claim 15, wherein the first antenna is mounted on the base unit.

17. The wireless system according to claim 15, wherein the second antenna is mounted on the first rotary unit.

18. The wireless system according to claim 15, wherein the first antenna and the second antenna at least partially overlap each other as viewed in a direction of the first axis or a direction of the second axis.

19. A method for controlling a wireless system, the wireless system including a first antenna configured to form at least part of a shape of a first ring and a second antenna configured to form at least part of a shape of a second ring, wherein the second antenna is capable of being coupled to the first antenna by an electromagnetic field, the method comprising:
performing first rotation control to rotate at least one of the first antenna and the second antenna about a first axis that passes through a substantial center of the first ring; and
performing second rotation control to rotate at least one of the first antenna and the second antenna about a second axis that passes through a substantial center of the second ring and that is substantially orthogonal to the first axis.

20. The method according to claim 19, wherein
in performing first rotation control, at least one of the first antenna and the second antenna is rotated about the first axis with the first antenna and the second antenna at least partially overlapping each other as viewed in a direction of the first axis or a direction of the second axis, and
wherein in performing second rotation control, at least one of the first antenna and the second antenna is rotated about the second axis with the first antenna and the second antenna at least partially overlapping each other as viewed in the direction of the first axis or the direction of the second axis.

* * * * *